No. 738,276. PATENTED SEPT. 8, 1903.
R. J. BARTON.
IMPLEMENT FOR STRETCHING HIDES.
APPLICATION FILED MAY 29, 1903.
NO MODEL.
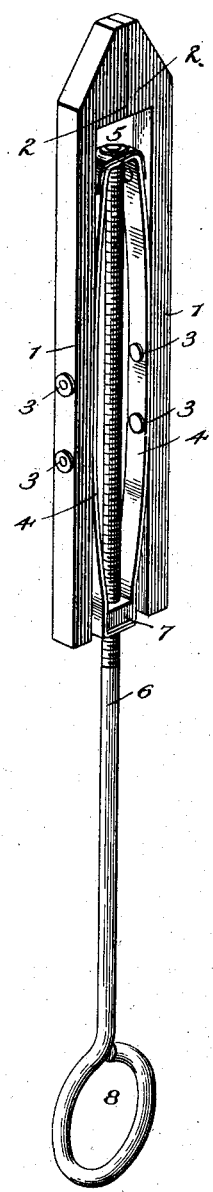
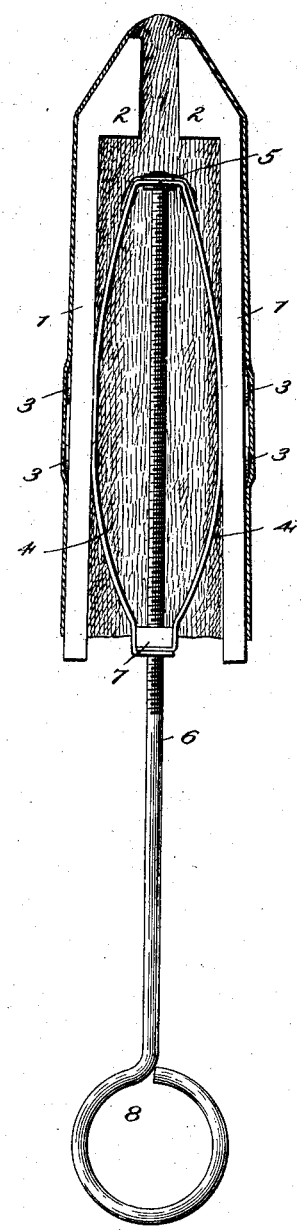
Witnesses
Edwin L. Bradford
John E. Burch
Inventor
Ross John Barton
By Johnson & Johnson
Attorneys
THE NORRIS PETERS CO., PHOTO-LITHO., WASHINGTON, D. C.

No. 738,276. Patented September 8, 1903.

UNITED STATES PATENT OFFICE.

ROSS JOHN BARTON, OF ANTOINE, ARKANSAS.

IMPLEMENT FOR STRETCHING HIDES.

SPECIFICATION forming part of Letters Patent No. 738,276, dated September 8, 1903.

Application filed May 29, 1903. Serial No. 159,264. (No model.)

*To all whom it may concern:*

Be it known that I, ROSS JOHN BARTON, a citizen of the United States, residing at Antoine, in the county of Pike and State of Arkansas, have invented certain new and useful Improvements in Implements for Stretching Hides, of which the following is a specification.

The invention herein is directed to the production of an improved implement for stretching hides that are cased—that is, hides or skins that are taken whole from the animal, such as the mink, the otter, and the opossum—in the form of a sleeve; and my improvement resides in the construction of a stretching device adapted to be inserted into the skin and to be expanded therein to stretch it for drying, as illustrated in the accompanying drawings, in which—

Figure 1 shows the implement with the stretching-bars contracted in their normal relation to each other for insertion into the skin to be stretched. Fig. 2 is a like view, the stretching-bars being in their expanded or stretching relation.

The provision by which the stretching-bars are connected to a pair of leaf-springs and the manner in which the springs are connected at their ends to a screw-rod to increase or to diminish their length, and thereby to effect the expansion and contraction of the stretching-bars, renders the implement effective and convenient for use. The stretching-bars 1 1 are of a length to stretch the skin transversely throughout its length, and they are pointed somewhat like a pair of pincers, the jaws 2 2 of which form stops to limit the closing of the bars. About mediately of the length of the bars are fastened by rivets 3 3 a pair of leaf-springs 4 4, one to each bar on their inner sides. These spring-leaves are about the length of the stretching-bars and form an elliptical spring. They are connected at their ends near the jaws of the bars by a swivel-joint 5 to the end of a screw-rod 6, which is central between the spring-leaves. The outer ends of the spring-leaves are connected by a nut 7, with which the screw-rod engages and beyond which it terminates in a handhold 8, by which it is turned to move the nut in or out to open or to close the stretching-bars. The connected spring-leaves are elliptical, and since the screw-rod has a swiveling connection with their inner ends and a traveling connection by the nut or the rod which connects the outer ends of the springs it is obvious that by turning the screw-rod to the right the nut will be drawn out, and the spring-leaves thereby elongated, which causes them to be contracted and the side bars to be drawn toward each other. When inserted in the skin, the screw-rod is turned to the left, which causes the nut to be driven inward upon the rod, thereby causing the leaves of the springs to be opened from each other, expanding the bars connected thereto and stretching the skin. The side bars are rigid and having a cushioning-expanding action on the hide and being fixed on the bow of each spring will give a uniform stretching action against the inner walls of the hide. The limiting of the closing of the bars prevents the crushing of the elliptical spring and keeps the bars in parallel relation for entering the sleeve formed by the hide.

It is important to note that the stretching function of the device is effected by the action of the screw-rod in causing the nut to force the outer ends of the spring-leaves toward its inner ends, and thereby cause the leaves to spread apart uniformly and to increase the resistance of the springs in proportion to the extent of their expansion, thus exerting a strong force to counteract the tendency of the hide to contract while being dried.

I claim—

1. An implement for stretching hides, comprised of a pair of parallel disconnected bars, and means for moving said bars to and from each other and maintaining them in parallelism consisting of a pair of leaf-springs having joined ends and intermediately attached at a plurality of points to said bars, a nut secured to the springs at their lower connected ends and a screw-rod engaging said nut and having a swivel connection with the springs at their upper connected ends.

2. An implement for stretching hides, comprised of a pair of parallel disconnected bars beveled at their upper ends, and means for moving said bars to and from each other and maintaining them in parallelism, consisting of a pair of leaf-springs having lap-joined upper ends and intermediately attached at a plurality of points to said bars, a nut secured to the springs at their lower connected ends and a screw-rod engaging said nut and having a swivel connection with the springs at their lapped ends said rods having a handle.

In testimony whereof I affix my signature in presence of two witnesses.

ROSS JOHN BARTON.

Witnesses:
HENRY PULLEN,
D. A. STELL.